United States Patent
Waiwood

[11] 3,955,416
[45] May 11, 1976

[54] THERMAL LIQUID LEVEL DETECTOR
[75] Inventor: William Paul Waiwood, Seven Hills, Ohio
[73] Assignee: International Telephone and Telegraph Corporation, New York, N.Y.
[22] Filed: Jan. 30, 1975
[21] Appl. No.: 545,503

[52] U.S. Cl. .............................................. 73/295
[51] Int. Cl.² ...................................... G01F 23/22
[58] Field of Search ................................... 73/295

[56] References Cited
UNITED STATES PATENTS
2,928,037   3/1960   Lawrence ............................ 73/295
3,324,722   6/1967   Reicks ................................ 73/295

Primary Examiner—James J. Gill
Assistant Examiner—Anthony V. Ciarlante
Attorney, Agent, or Firm—James B. Raden; William J. Michals

[57] ABSTRACT

A pulsed thermal liquid level detector system is disclosed. The system includes a probe having a thermistor and a resistor disposed therein. The thermistor is thermally coupled to the resistor and is thermally coupled to a predetermined external surface of the probe by way of a material of low thermal resistance and capacity. The resistor is electrically coupled to a source of pulses which act to dissipate energy in the resistor thereby to heat the thermistor in accordance with the level of the pulses. The resistance of the thermistor varies in accordance with the temperature excursions induced by the pulses and within a range determined by the thermal capacity of the thermistor. The effective thermal capacity of the thermistor increases when the predetermined external surface is thermally coupled to a liquid which therefore reduces the resistance excursions of the thermistor. The resistance of the thermistor is monitored by an external circuit to provide an indication of a liquid level transition when the resistance excursions of the thermistor are greater or less than a predetermined value.

13 Claims, 6 Drawing Figures

FIG. 2b (LOW LEVEL)

FIG. 2c (HIGH LEVEL)

3,955,416

THERMAL LIQUID LEVEL DETECTOR

BACKGROUND OF THE INVENTION

This invention relates to liquid level detecting or sensing systems and, more particularly, to a pulse heated thermal detector wherein the effective thermal capacity of a thermistor sensor is used in conjunction with induced pulsed resistance excursions to determine the liquid level.

Liquid level detecting systems are known in the art and have been used for detecting the relative or absolute level of a liquid in a vessel such as, for example, the tank of a hot water boiler system. In these applications, it is particularly desirable to sense a dangerously low liquid level situation so as to preclude damage to the boiler tank. A widely used prior art technique has been to project an electrode probe into the boiler tank and in electrical series with an alarm circuit wherein the liquid itself is used as an electrical conductor to complete an electrical circuit when the water is above the level of the probe. These systems are not only expensive to install, but are also subject to contamination and fouling of the probe in the hostile environment of the tank.

More recently, liquid level detecting systems have employed probes which include a highly thermally conductive member such as a metallic pin one end of which projects into the tank for contact with the liquid therein. The other end of the pin is in contact with a heater such as a resistance heater. The other end of the pin is also in contact with a precious-metal contact assembly wherein the thermal expansion coefficient of the contact assembly is used in conjunction with the difference in thermal conductivity at the projecting end of the probe as the liquid level varies to provide a closure to activate an external alarm. However, these devices require temperature compensation for changes in ambient temperatures; and by definition the device includes moving parts which are subject to failure.

Prior art liquid level detecting systems have also utilized thermistor devices as an integral part of a probe projected into a liquid containing vessel, and wherein the resistance variation of the thermistor as a function of temperature is utilized to provide a liquid level indication. That is, the absence or presence of the liquid varies the total or absolute resistance of the thermistor. Here again, however, these devices require temperature compensation such as the use of a second thermistor at a remote location which is used to cancel variations in ambient temperature.

These and other disadvantages are overcome by the present invention wherein there is provided a pulse heated thermal liquid level detector having no moving parts and wherein ambient temperature variations do not affect the operation of the sensor.

SUMMARY OF THE INVENTION

Briefly, a thermal level detecting system which is particularly suitable for use as a liquid level detector is provided. The system includes a probe adapted for coupling to a vessel having a liquid disposed therein and having a given external surface adapted for thermal coupling to the liquid, and wherein the level of the liquid may vary relative to the given external surface whereby the relative thermal coupling between the liquid and the given external surface varies between minimum and maximum values. A thermistor is disposed within the probe and is thermally coupled to the given external surface of the probe wherein a low thermal resistance and path is provided between the thermistor and the given external surface and wherein the effective thermal capacity of the thermistor increases substantially relative to the low thermal capacity when the thermal coupling is the maximum value. Means thermally coupled to the thermistor are provided for heating the thermistor in accordance with a predetermined series of pulses wherein the electrical resistance of the thermistor varies in accordance with the temperature excursions induced by the pulses and varies between two levels and determined by the effective thermal capacity of the thermistor. Means are also provided for detecting the electrical resistance of ther thermistor to provide an output signal when the effective thermal capacity of the thermistor changes significantly.

BRIEF DESCRIPTION OF THE DRAWING

The advantages of this invention will become more readily appreciated as the same become better understood by reference to the following detailed description when taken in conjunction with the accompanying drawing wherein:

FIGS. 2a—c provide waveforms useful in explaining the principals of the present invention;

DETAILED DESCRIPTION

Figure 1:
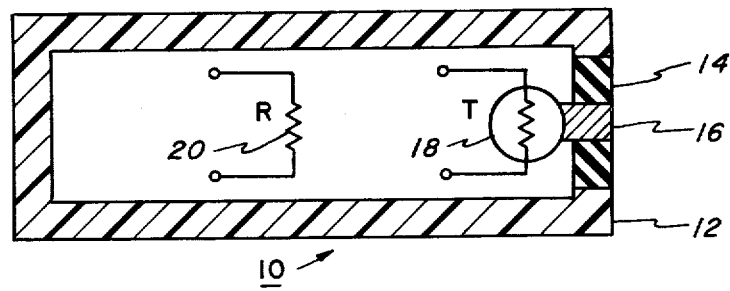
FIG. 1 is a pictorial cross-sectional view showing the general arrangement of a suitable probe in accordance with the present invention.

Referring now to FIG. 1, there is shown generally at 10 a cross sectional view of a suitable probe 10 arranged in accordance with the present invention. Probe 10 includes a housing 12 which may comprise a metallic or any other suitable material. Probe 10 further includes an insulator 14 which may take the form of an annular ring or any other suitable geometry. Disposed within the central opening of insulator 14 is a low thermal mass member 16 which may take the form of a stud, "nail" or any other suitable member of low thermal resistance and capacity. Disposed within probe 10 are a thermistor 18 and a resistor 20. Thermistor 18 which also has a low thermal capacity is preferably in intimate contact with the internal end of member 16 so that a low thermal resistance and capacity path is provided between thermistor 18 and the external end of member 16. Resistor 20 is located adjacent to thermistor 18 either in contact therewith or over a path of low thermal resistance such as a suitable thermal compound.

In operation, probe 10 in accordance with the principles of the present invention is coupled to a liquid containing vessel either internally or externally thereof. Resistor 20 is electrically coupled to a source of predetermined electrical pulses which act to dissipate energy in resistor 20 thereby to heat thermistor 18 in accordance with the level of the pulses. Since resistor 20 is thermally coupled to thermistor 18 over a relatively low thermal resistance path, the resistance of thermistor 18 varies in accordance with the temperature excursions induced by the pulses. The range of the temperature excursions is determined by the power input applied to resistor 20; and the thermal capacity of thermistor 18, the thermal capacity of resistor, and the thermal capacity of the path between resistor 20 and the external end of member 16. Thermistor 18 is coupled to the liquid containing vessel by way of member 16 which also has a very low thermal resistance and thermal capacity. If thermistor 18 is coupled to a liquid within the vessel, by way of member 16, the effective thermal capacity of the thermistor increases substantially. Accordingly, the thermal mass, and therefore the thermal time constant, of the thermistor is also increased.

Figure 2A:
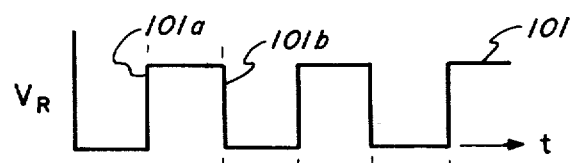

Referring now to FIGS. 2a-c, there are shown waveforms useful in explaining the principals of operation of the thermal liquid level detecting system in accordance with the present invention. The predetermined electrical pulses are represented by curve 101. It can be seen that each pulse has a positive-going leading edge 101a and a negative-going trailing edge 101b. These pulses are used to heat resistor 20 which, in turn, varies the resistance of thermistor 18. The varying resistance of thermistor 18 for low and high liquid levels is respectively illustrated by curves 120 and 120' of FIGS. 2b and 2c. It can be seen by reference to FIG. 2b that after the leading edge of each pulse, that is, during the pulse "ON" time, the thermistor is caused to be heated by the induced heat pulses; and, accordingly, the resistance of the thermistor decreases during this period. After the trailing edge of each pulse in the series 101, the thermistor is allowed to cool whereupon the resistance increases. Accordingly, the maximum and minimum values of the resistance excursions or variations are closely related to the leading and trailing edges of pulses 101.

It should now be appreciated that when the liquid in the vessel is below the level of probe 10, the effective thermal capacity of thermistor 18 is such that the thermistor 18 tracks the temperature variations. If, however, the liquid is in thermal contact with thermistor 18 (or member 16) the effective thermal capacity of thermistor 18 is substantially increased so that the resistance of thermistor 18 does not readily track the induced temperature variations. Thus, it should now be appreciated that when the level of resistance excursions of thermistor 18 changes significantly, as when the liquid level rises into or drops below thermal contact with probe 10, this significant change can be used as a liquid level indication. It will be appreciated by those skilled in the art that both positive and negative temperature coefficient thermistors are available and that either may be used equally well in a level detection system in accordance with the teachings of the present invention.

Figure 3:
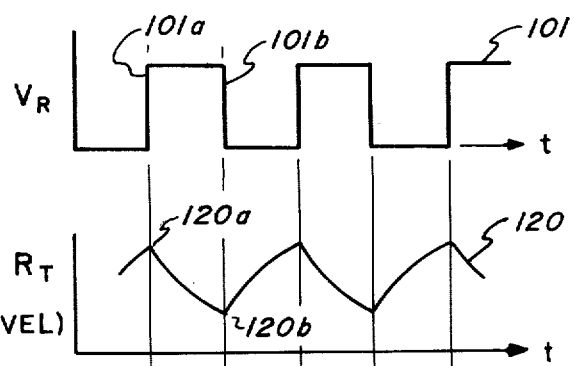
FIG. 3 is a pictorial cross-sectional view of the probe of FIG. 1 as adapted for mounting to an external surface of a liquid containing vessel; and, FIG. 4 is a schematic diagram of one suitable circuit for use in a liquid level detecting system in accordance with the present invention.
Figure 3:
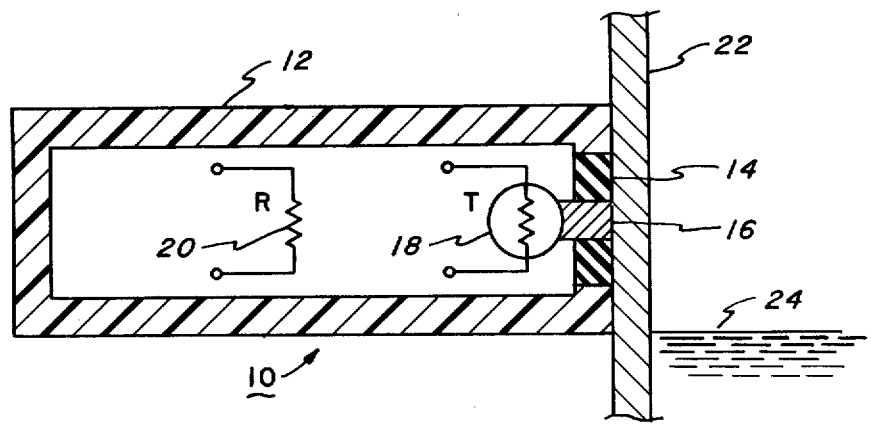

Referring now to FIG. 3, there is shown a currently preferred method for coupling or attaching probe 10 to a liquid containing vessel. The wall of the vessel is illustrated in cross section at 22 and the liquid disposed within the vessel is indicated at 24. It can be seen that probe 10 is coupled externally of the vessel on the outside portion of wall 22. This mounting technique is preferred as probe 10 can be suitably bonded, welded or otherwise coupled to wall 22 without necessitating a hole or aperture in wall 22. Of course, probe 10 can be mounted to wall 22 in a suitable recess or shoulder portion which extends partially through wall 22, thereby to maximize the sensitivity of probe 10.

Figure 4:
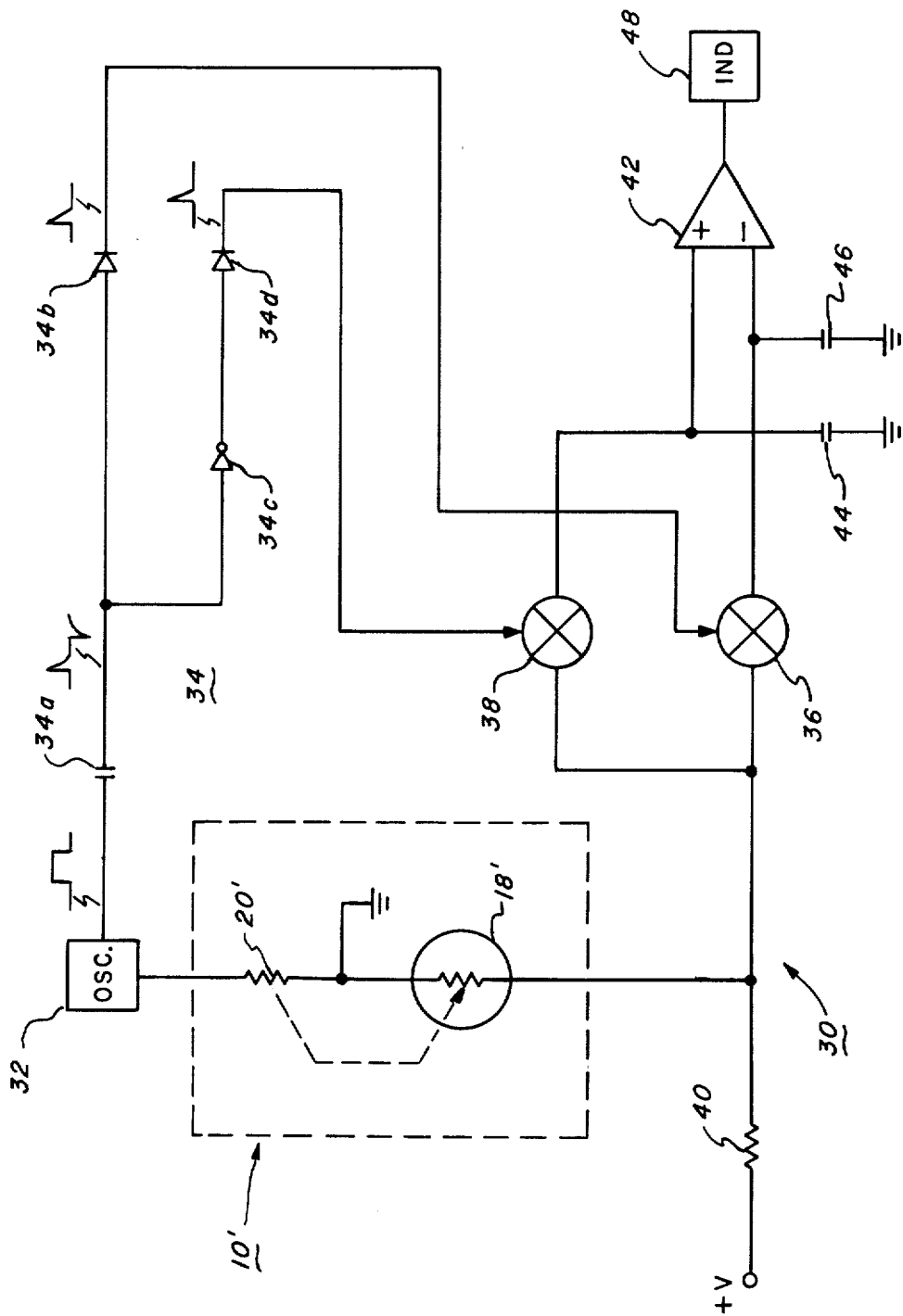

Referring now to FIG. 4, there is shown a schematic diagram of a suitable electronic circuit 30 for sensing the change in resistance variations of thermistor 18 of the liquid level detector in accordance with the present invention. Circuit 30 includes an oscillator 32 which generates a predetermined series of pulses which are coupled to resistor 20' of probe 10'. These pulses are also coupled to a differentiating circuit 34 at capacitor 34a. Capacitor 34a functions to differentitate the leading and trailing edge of each pulse to provide a pulse pair indicative thereof. The differentiated leading pulse provides forward bias for a diode 34b and is coupled therethrough. The differentiated pulse pair is also coupled to an inverter 34c which provides an inverted version thereof. Accordingly, the trailing edge of each pulse at the output of 34c provides forward bias for a diode 34d and is coupled therethrough. The output of diode 34b is coupled to a first gaiting circuit 36, and the output of diode 34d is coupled to a second gaiting circuit 38.

Resistor 20' and thermistor 18' are each coupled at one end thereof to a fixed point of reference potential such as ground. The other end of thermistor 18' is coupled to a point of fixed reference potential (+V) by way of a resistor 40. The junction of resistor 40 and thermistor 18' is also coupled as an input to gating circuit 36 and gating circuit 38. The outputs of gating circuits 36 and 38 are respectively coupled to the minus ("−") and plus ("+") inputs of a comparator 42. The + input of of comparator 42 is coupled to ground by way of an integrating capacitor 44, and the − input of comparator 42 is similarly coupled to ground by way of another integrating capacitor 46. The output of comparator 42 is coupled to an indicating device or utilization means 48. It will be appreciated that comparator 42 may take the form of a conventional comparator, a Schmitt trigger, or any other suitable threshold device.

The operation of circuit 30 is as follows. The output pulses of oscillator 32 dissipate energy in resistor 20' and the heat generated thereby is coupled to thermistor 18'. As the level of resistance of thermistor 18' varies, the voltage at the junction of resistor 40 and thermistor 18' varies accordingly. The signal voltage thusly generated is coupled to the + input of comparator 42 during the trailing edge of each pulse from oscillator 32. Similarly, this signal voltage is coupled to the − input of comparator 42 during the leading edge of each output pulse of oscillator 32. The gated signals are respectively filtered and integrated by capacitors 44 and 46. When the difference between the voltages respectively stored by capacitors 44 and 46 exceeds a predetermined value, an output transition at the output of comparator 42 occurs and indicator or utilization means 48 thereby provides a signal indicative of a high or low liquid level.

It should be appreciated, however, that circuit 30 of FIG. 4 is but one suitable way of utilizing the induced resistance variations of thermistor 18' (18) to indicate a liquid level. That is, the teachings of the present invention readily can be extended within the skill of the art to provide suitable utilization circuits other than that depicted in FIG. 4.

It will also be appreciated by those skilled in the art that since it is the rate of change or A.C. component of resistance change which is sensed to provide the liquid level signal, the detection process is essentially independent of the absolute resistance of the thermistor, and, therefore, independent of ambient temperature. Accordingly, temperature compensation for the thermistor element, in accordance with the present invention, need not be provided.

It should be noted that the probe can be provided in a variety of forms and mounting installations. Further, the probe can consist of a suitable quantity of a thermally conductive glue which is affixed to a given surface of the vessel and wherein the thermistor and pulse heating means or resistor are merely bonded to the vessel. Of course, the probe may take the form of a pressure tight housing installed either through the top or through a side of a tank or vessel.

It should also be noted that the probe can be provided to accomodate two separate thermistors, such as by way of a bifurcated probe, wherein two liquid levels ar sensed. It will also be appreciated that a given application of the present invention may employ a plurality of separate probes so as to provide a plurality of level detection points. Additionally, the detection circuitry may include a suitable time-delay circuit to preclude a premature output signal condition as might otherwise occur during a liquid splash.

Finally, while the foregoing description relates to liquid level detection, it should be appreciated that the structure of the present invention should provide equally satisfactory results with various solids such as particulate matter. It is anticipated that equally satisfactory results are obtainable in these applications provided that the thermal characteristics of the media are sufficient to cause a detectable difference in the effective thermal capacity of the thermistor configuration in accordance with the present invention.

What has been taught, then, is a pulse-heated, liquid level detector facilitating, notably, liquid level detection in the tank or vessel of a hot water heating system. The form of the invention illustrated and described herein is but a preferred embodiment of these teachings. It is shown as an illustration of the inventive concepts, however, rather than by way of limitation, and it is pointed out that various modifications and alterations may be indulged in within the scope of the appended claims:

What is claimed is:

1. A thermal level detecting system comprising, in combination:
    a probe adapted for coupling to a vessel having a substance disposed therein, said probe having a given external surface adapted for thermal coupling to said substance and wherein the level of said substance may vary relative to said given external surface whereby the relative thermal coupling between said substance and said given external surface varies between minimum and maximum values;
    a thermistor disposed within said probe and thermally coupled to said given external surface of said probe wherein a low thermal resistance and capacity path is provided between said thermistor and said given external surface and wherein the effective thermal capacity of said thermistor increases substantially relative to said low thermal capacity when said relative thermal coupling is said maximum value;
    means for heating said thermistor in accordance with a predetermined series of pulses;
    means thermally coupling said thermistor to said heating means so that the electrical resistance of said thermistor changes in correspondence with each of said pulses; and,
    means for detecting said electrical resistance changes to provide an output signal.

2. The detecting system according to claim 1, wherein said substance is a liquid.

3. The detecting system according to claim 2, wherein the means for heating said thermistor includes a resistive electrical impedance disposed within said probe and said impedance being coupled with a source of electrical pulses.

4. The detecting system according to claim 3, wherein said impedance comprises a resistor.

5. The detecting system according to claim 2, wherein said probe is adapted to be fixedly mounted to said vessel on an external surface thereof.

6. The detecting system according to claim 2, wherein said probe is adapted to be projected into said vessel wherein said given external surface is adapted to directly contact said liquid.

7. A thermal liquid level detecting system comprising, in combination:
    a vessel having a liquid disposed therein;
    a probe adapted for mounting at a given surface of said vessel, said probe having a given external surface adapted for thermal coupling to said liquid and wherein the level of said liquid may vary relative to said given external surface whereby the relative thermal coupling between said liquid and said given external surface varies between minimum and maximum values;
    a thermistor cooperating with said probe and thermally coupled to said given external surface of said probe wherein a low thermal resistance and capacity path is provided between said thermistor and said given external surface and wherein the effective thermal capacity of said thermistor increases substantially relative to said low thermal capacity when said relative thermal coupling is said maximum value;
    means for heating said thermistor in accordance with a predetermined series of pulses;
    means thermally coupling said thermistor to said heating means so that the electrical resistance of said thermistor changes in correspondence with each of said pulses; and,
    means for detecting said electrical resistance changes to provide an output signal.

8. The detecting system according to claim 7, wherein the means for heating said thermistor includes a resistive electrical impedance disposed within said probe and said impedance being coupled to a source of electrical pulses.

9. The detecting system according to claim 8, wherein said impedance comprises a resistor.

10. The detecting system according to claim 7, including means for delaying the operation of said means for detecting until a new level attained by said liquid is maintained for at least a predetermined period.

11. The detecting system according to claim 7, wherein said vessel is a tank element of a steam boiler and wherein said probe is fixedly mounted to a given surface of said tank.

12. A method for sensing the level of a liquid in a vessel comprising the steps of:
    coupling a thermistor to said vessel;
    providing a source of heating pulses;
    pulse heating said thermistor by thermally coupling said source to said thermistor so that the electrical resistance of said thermistor changes in correspondence with each of said pulses sensing the pulsed electrical resistance changes of said thermistor essentially independently of the absolute resistance of said thermistor; and providing an output signal indicative of the level of said liquid when the level of said pulsed electrical resistance changes changes significantly.

13. A thermal liquid level detecting system comprising, in combination:
- a probe adapted for coupling to a vessel having a liquid disposed therein, said probe having a given external surface adapted for thermal coupling to said substance and wherein the level of said liquid may vary relative to said given external surface whereby the relative thermal coupling between said liquid and said given external surface varies between minimum and maximum values;
- a thermistor disposed within said probe and thermally coupled to said given external surface of said probe wherein a low thermal resistance and capacity path is provided between said thermistor and said given external surface and wherein the effective thermal capacity of said thermistor increases substantially relative to said low thermal capacity when said relative thermal coupling is said maximum value;
- means coupled to said thermistor for heating said thermistor in accordance with a predetermined series of pulses so that the electrical resistance of said thermistor changes in correspondence with each of said pulses between two levels determined by the effective thermal capacity of said thermistor; and
- means for detecting the electrical resistance changes of said thermistor essentially independently of the absolute electrical resistance of the thermistor to provide an output signal when the amplitude of the changes varies significantly.

* * * * *